Patented Jan. 31, 1928.

1,657,666

UNITED STATES PATENT OFFICE.

RIDSDALE ELLIS, OF OAK PARK, ILLINOIS.

FLOTATION PROCESS.

No Drawing.    Application filed July 29, 1925.   Serial No. 46,880.

My invention relates to processes for concentrating ores and other materials by means of froth flotation and the like.

More particularly my invention relates to the treatment of ore pulps containing free metallic copper especially precipitated or so-called "cement" copper.

Many copper ores contain varying percentages of leachable copper or "oxidized" copper, such as copper carbonate, either alone or more usually in conjunction with copper sulphide. One of the methods in use for concentrating such ores especially mixed oxidized and sulphide ores, is to bring the former constituent into solution, then precipitate it with sponge iron and finally float the precipitated or cement copper simultaneously with the sulphide copper.

The principal object of my invention is to improve the separation of free metallic copper, especially precipitated or cement copper, from ore pulps containing such free metallic copper.

Now I have found that oxidizing agents greatly improve the extraction of such free metallic copper. Thus in the case of a copper ore from Ajo, Arizona, containing 1.45% oxidized copper and 0.15% sulphide copper the use of 3 lbs. per ton of bleaching powder reduced the copper in the tailings (after dissolving the copper, precipitating it with sponge iron and then floating) from 0.38% to 0.10%.

The active agent in bleaching powder is calcium hypochlorite and I prefer to use this compound or the corresponding sodium compound on account of their cheapness.

Hypochlorites are mentioned, however, only as preferred examples and other oxidizing agents may be used if desired.

Thus, in addition to or instead of an oxidizing agent, such as hypochlorite, in solid or liquid (or solution) form, I may also carry out emulsification or both emulsification and flotation in the presence of an atmosphere of externally prepared oxygen.

The term "oxidizing agent" is used to denote any agent—solid, liquid or gaseous—having a greater oxidizing power than atmospheric air and also adapted to oxidize a compound, such, for example, as a sulphite to sulphate, and not a material such as carbonic or sulphuric acids which may oxidize a metal in the sense that by their action the metal is converted into an oxygen containing salt.

While in general it is necessary to add an acid, such as sulphuric, or other solvent to bring the oxidized copper into solution, this is not always necessary as in some cases the ore itself or the mine water used in the mill contains copper sulphate in solution which it is desired to extract. Further, in some cases there may be native copper present. Where an acid is present in the ore pulp neutralization is not essential since the hypochlorous acid liberated by the acid is a strong oxidizing agent.

While oxidizing agents aid the flotation of cement copper they also aid the re-solution of such copper by oxidizing the ferrous sulphate produced by the reaction between sponge iron and the copper sulphate. The ferric sulphate dissolves the copper with the formation of ferrous sulphate which is in turn re-oxidized and so on.

These reactions not only put the copper in solution again but also use up the oxidizing agent employed.

I prefer, therefore, before adding the oxidizing agent to add alkali and pass air through the ore pulp to precipitate the iron salts. An insoluble basic ferric sulphate is formed. The reaction when lime is used as the alkali is approximately expressed by the equation:—

$$2FeSO_4 + Ca(OH)_2 + 7H_2O + O_2 = Fe_2SO_4(OH)_4 5H_2O + CaSO_4$$

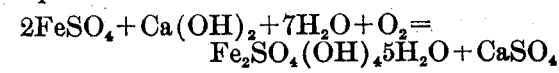

It will be seen that the amount of lime required to precipitate the iron as a basic sulphate is only about half that required to produce ferrous hydroxide.

After having eliminated the iron salts in this way the usual flotation oil or other reagent is added together with the oxidizing agent employed to aid the flotation of the cement copper and also incidentally the sulphide copper. It will also be understood that by avoiding the re-solution of the cement copper by the ferric sulphate produced by the oxidation of the ferrous sulphate by the air, normally used in flotation, beneficial results are obtained by the use of lime even though no oxidizing agent is used subsequently.

As acid is used to bring the leachable copper into solution, alkali is used to precipitate the iron salts and oxygen is useful to aid the flotation of the cement copper, these three reagents may to advantage be prepared simultaneously by the electrolysis of sodium sulphate. At the cathode caustic soda and hydrogen are formed; at the anode sulphuric acid and oxygen. Any of the various well known forms of electrolytic apparatus may be used for this purpose.

For the flotation of the precipitated copper after the addition of the oxidizing agent any suitable form of flotation apparatus may be employed, such as the well known mechanical agitation or minerals separation type or the pneumatic agitation or callow type. These forms of apparatus are so well known that they are not illustrated here.

It will also be understood that the usual flotation "modifying agents" such as collecting and frothing oils as well as soluble organic frothing agents may be used as commonly practiced by those skilled in the art.

I am aware that numerous details of the process may be varied through a wide range without departing from the spirit of this invention, and I do not desire limiting the patent granted otherwise than as necessitated by the prior art.

I claim—

1. The process of concentrating copper ores containing leachable copper by flotation, which includes dissolving such leachable copper, precipitating such copper with sponge iron in free metallic form, adding a precipitant for the iron salts produced, mixing the ore pulp with a modifying agent, aerating the pulp to form a froth and separating the froth from the remainder by flotation, and which further includes the use of an oxidizing agent to aid the flotation of the precipitated copper.

2. The process of concentrating copper ores containing leachable copper by flotation which includes dissolving such leachable copper, precipitating such copper in free metallic form, mixing the ore pulp with a modifying agent, aerating the pulp to form a froth and separating the froth from the remainder by flotation, and which further includes the use of an oxidizing agent to aid the flotation of the precipitated copper.

3. The process of concentrating copper ores containing leachable copper by flotation which includes dissolving such leachable copper, precipitating such copper with sponge iron in free metallic form, adding a precipitant for the iron salts produced, mixing the ore pulp with a modifying agent, aerating the pulp to form a froth and separating the froth from the remainder by flotation, and which further includes the use of a hypochlorite to aid in the flotation of the precipitated copper.

4. The process of concentrating copper ores containing leachable copper by flotation which includes dissolving such leachable copper with sulphuric acid, precipitating such copper with sponge iron in free metallic form, adding a smaller proportion of alkali than that required to convert all of the iron salts in solution into hydroxide, oxidizing such salts by means of atmospheric air, mixing the ore pulp with a modifying agent, aerating the pulp to form a froth and separating the froth from the remainder by flotation.

5. The process of concentrating copper ores containing leachable copper by flotation which includes dissolving such leachable copper with sulphuric acid, precipitating such copper with sponge iron in the free metallic form, adding a smaller proportion of alkali than that required to convert all of the iron salts in solution into hydroxide, oxidizing such salts by means of atmospheric air, mixing the ore pulp with a modifying agent, aerating the pulp to form a froth and separating the froth from the remainder by flotation, and which further includes the use of an oxidizing agent to aid the flotation of the precipitated copper.

6. The process of concentrating copper ores containing leachable copper by flotation which includes dissolving such leachable copper with sulphuric acid, precipitating such copper with sponge iron in the free metallic form, adding a smaller proportion of alkali than that required to convert all of the iron salts in solution into hydroxide, mixing the ore pulp with a modifying agent, aerating the pulp to form a froth and separating the froth from the remainder by flotation.

RIDSDALE ELLIS.